(12) United States Patent
Flake et al.

(10) Patent No.: US 8,582,127 B2
(45) Date of Patent: Nov. 12, 2013

(54) UPDATING OLD MEDIA WITH CONFIGURABLE ENTITIES

(75) Inventors: Gary W. Flake, Bellevue, WA (US); Eric J. Horvitz, Kirkland, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 11/960,089

(22) Filed: Dec. 19, 2007

(65) Prior Publication Data

US 2008/0151315 A1 Jun. 26, 2008

Related U.S. Application Data

(60) Provisional application No. 60/870,926, filed on Dec. 20, 2006.

(51) Int. Cl.
*H04N 1/00* (2006.01)
(52) U.S. Cl.
USPC ............... 358/1.13; 358/401; 707/1; 704/260
(58) Field of Classification Search
USPC .................. 358/1.13, 401; 707/1; 704/260
See application file for complete search history.

(56) References Cited

U.S. PATENT DOCUMENTS

| | | | | |
|---|---|---|---|---|
| 5,832,432 A | * | 11/1998 | Trader et al. | 704/260 |
| 2002/0188635 A1 | * | 12/2002 | Larson | 707/515 |
| 2004/0177058 A1 | * | 9/2004 | Carpentier et al. | 707/1 |
| 2004/0267595 A1 | * | 12/2004 | Woodings et al. | 705/9 |
| 2005/0006480 A1 | * | 1/2005 | Talluri et al. | 235/468 |
| 2005/0251456 A1 | * | 11/2005 | Perkowski | 705/26 |

OTHER PUBLICATIONS

BillionDollarHomePageOnline, http://web.archive.org/web/20060503001504/http://www.billiondollarhomepageonline.com.*
BillionDollarHomePageOnline, http://web.archive.org/web/20060821202408/http://www.billiondollarhomepageonline.com.*
http://web.archive.org/web/20060503001504://www.billiondollarhomepageonline.com http://billiondollarhomepageonline.com May 3, 2006 http://billiondolarhomepageonline.com Aug. 21, 2006.*
http://web.archive.org/web/20060503001504://www.biliondollarhomepageonline.com http://biliondollarhomepageonline.com May 3, 2006 http://biliondolarhomepageonline.com Aug. 21, 2006.*
Billion Dollar Home Page Online, May 2006.*

* cited by examiner

*Primary Examiner* — Allen H Nguyen
(74) *Attorney, Agent, or Firm* — Shook, Hardy & Bacon L.L.P.

(57) ABSTRACT

The claimed subject matter relates to an architecture that can provide configurable entities in connection with electronic archival of print-based media. In accordance therewith, print-based media can be archived electronically (e.g., by imaging or scanning the print-based media) in a remastered form that provides for displaying the original work with readily modifiable entities, such as advertisements. Media or entities can be selected based upon the original advertiser, the original product, or another element or feature of the print-based media, and can also be selected based upon a profile associated with the media consumer.

17 Claims, 12 Drawing Sheets

UPDATING OLD MEDIA WITH CONFIGURABLE ENTITIES

CROSS-REFERENCE TO RELATED APPLICATIONS

This application claims the benefit of U.S. Provisional Application Ser. No. 60/870,926, filed Dec. 20, 2006, entitled "ARCHITECTURES FOR SEARCH AND ADVERTISING." This application is related to U.S. application Ser. No. 11/958,677, filed on Dec. 18, 2007, entitled "PYRAMIDAL VOLUMES OF ADVERTISING SPACE." The entireties of these applications are incorporated herein by reference.

BACKGROUND

Old media and/or print-based media such as newspapers, magazines, books, brochures, advertising material and so forth currently exist in near limitless quantities and can contain a wide range of content. Print-based media often inherently casts vintage qualities and generally evokes a sense of nostalgia for its audiences, especially in relation to its age. In addition, some print-based media can be coveted by collectors, obtain classic status, or be memorable or important for any number of reasons.

Today, with the rapid growth of the Internet and web based content providers, more and more media consumers are turning to electronic-based media. However, print-based media still thrives as an industry and many print-based media publishers also provide online version and/or archives of the print-based media in an electronic format. Still, there are many potential opportunities in connection with such archival processes that are currently overlooked in this industry today, as well as ways of extending certain desirable characteristic to print-based media to electronic-based media.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can provide adaptable or configurable entities in connection with electronic archival of print-based media. To these and other related ends, the architecture can "remaster" print-based media by storing to an electronic archive an updateable or updated version of the original print-based media. In particular, the architecture can identify and tag suitable entities apparent in the original print-based media that can be updated in later displays or printed versions, in which tagged entities can be replaced by updated entities based upon a variety of criteria.

For example, the architecture can replace advertisements (or other content) with a modernized advertisement from the same advertiser. Similarly, the architecture can replace an ad with another product altogether, even from a different manufacturer. Hence, an older advertisement for, say, a camera can be updated with a newer model from the same manufacturer, another manufacture, and/or with a different product. Moreover, it should be appreciated that the one-shot advertising model associated with print-based media can be augmented with a greater potential for recurring ad revenue stemming from the remastered versions (e.g., from both updateable and updated media, both of which can be stored to an associated archive in a data store as remastered versions).

According to another aspect, the architecture can also tailor the updated entity to match a user profile such that the advertisement can be dynamically adjusted based upon ad targeting schemes or models. In addition, to selecting updated entities to embed in the remastered work, the architecture can also select remastered works to match particular updated entities. For example, a user can submit content and the architecture can search for updateable media that is appropriate for insertion of the updated entity. Moreover, the architecture can obscure the updated entity unless or until an associated provider pays for the insertion or display.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
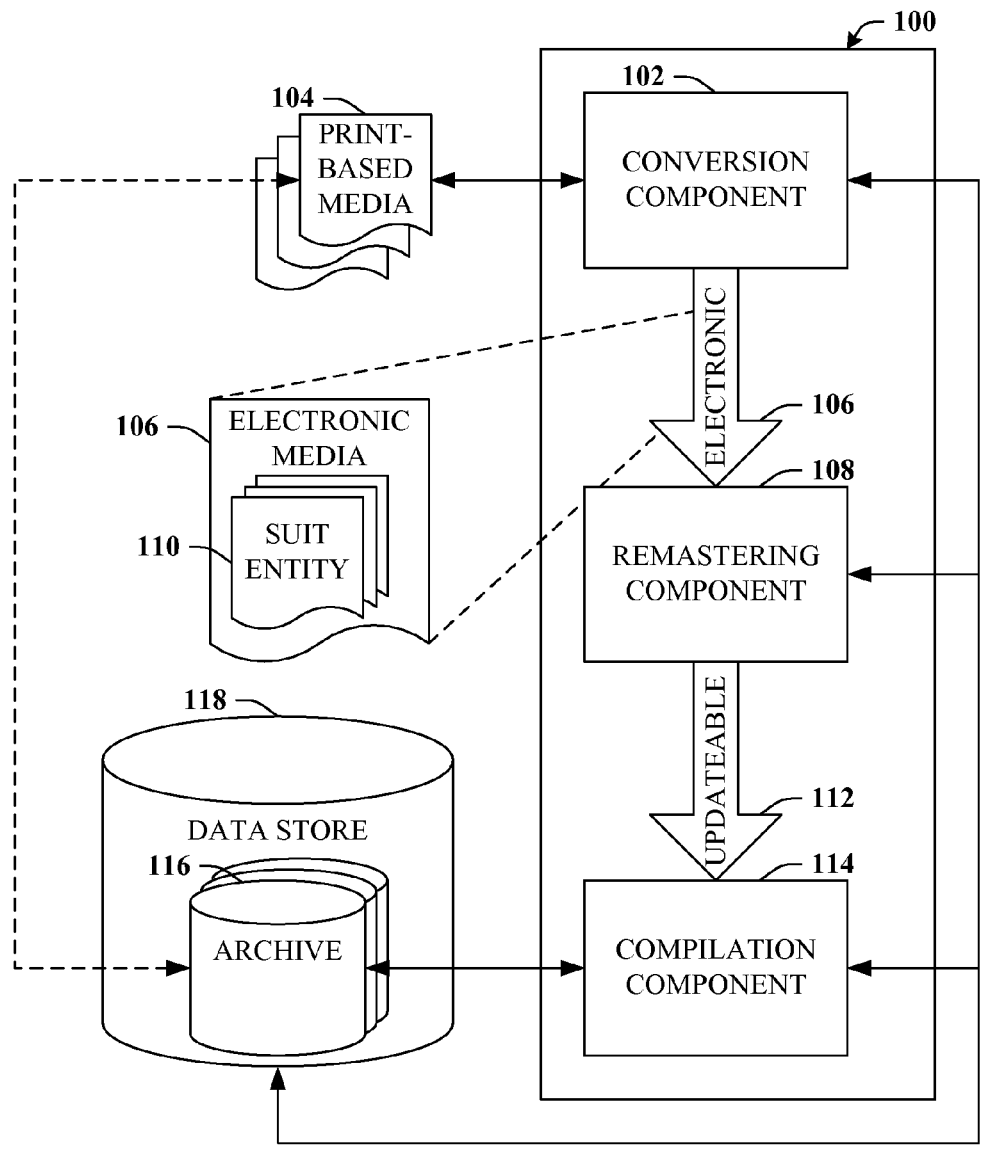
FIG. 1 illustrates a block diagram of a system that can provide adaptable entities in connection with electronic archival of print-based media.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that the claimed subject matter can be utilized with at least one of a display engine, a browsing engine, a content aggregator, and/or any suitable combination thereof. A "display engine" can refer to a resource or component (e.g., hardware, software, and/or any combination thereof) that enables seamless panning and/or zooming of content within an environment in multiple scales, resolutions, and/or levels of detail, wherein detail can be related to a number of pixels dedicated to a particular object or feature that carry unique information. In accordance therewith, the term "resolution" is generally intended to mean a number of pixels assigned to an object, detail, or feature of a displayed image and/or a number of pixels displayed with unique logical image data. Thus, conventional forms of changing resolution that merely assign more or fewer pixels to the same amount of image data can be readily distinguished. Moreover, the display engine can create space volume within the environment based on zooming out from a perspective view or reduce space volume within the environment based on zooming in from a perspective view. Furthermore, a "browsing engine" can refer to a resource or component (e.g., hardware, software, and/or any suitable combination thereof) that employs seamless panning and/or zooming at multiple scales with various resolutions for data associated with an environment, wherein the environment is at least one of the Internet, a network, a server, a website, a web page, and/or a portion of the Internet (e.g., data, audio, video, text, image, etc.). Additionally, a "content aggregator" can collect two-dimensional data (e.g., media data, images, video, photographs, metadata, etc.) to create a three dimensional (3D) virtual environment that can be explored (e.g., browsing, viewing, and/or roaming such content and each perspective of the collected content).

Referring now to the drawings, with reference initially to FIG. 1, system 100 that can provide adaptable entities in connection with electronic archival of print-based media is depicted. Generally, system 100 can include conversion component 102 that can scan or image print-based media 104 in order to reproduce the print-based media 104 as electronic media 106 that is replicated in a computer-readable format including virtually any type of exchange or interchange file format, with substantially any type of codec or encoding, and with or without compression techniques. Print-based media 104 can be substantially any type of printed work product including, e.g. magazines, newspapers, brochures, leaflets, reports, advertising material, graphic design, artistic works, books, and so on. In some cases, conversion component 102 can convert existing electronically stored media into electronic media 106 such as when certain print-based media 104 has been previously imaged and saved to a data base or computer-readable medium.

System 100 can also include remastering component 108 that can identify one or more suitable entities 110 included in electronic media 106. For example, suitable entity 110 can be an electronic representation of some object that is apparent in print-based media 104. In particular, suitable entity 110 will typically be, e.g., an advertisement that accompanies the original print-based media 104. Additionally, however, suitable entity 110 can also be a product, a person, a feature, etc. that is apparent in print-based media 104. In addition to identifying suitable entity 110, remastering component 108 can further tag suitable entity 110 with, e.g., metadata or annotations to produce updateable media 112. For instance, updateable media 112 can include various tags to facilitate speedy look-ups, comparisons, and/or matching, various examples of which can be found with reference to FIG. 2.

Figure 2:
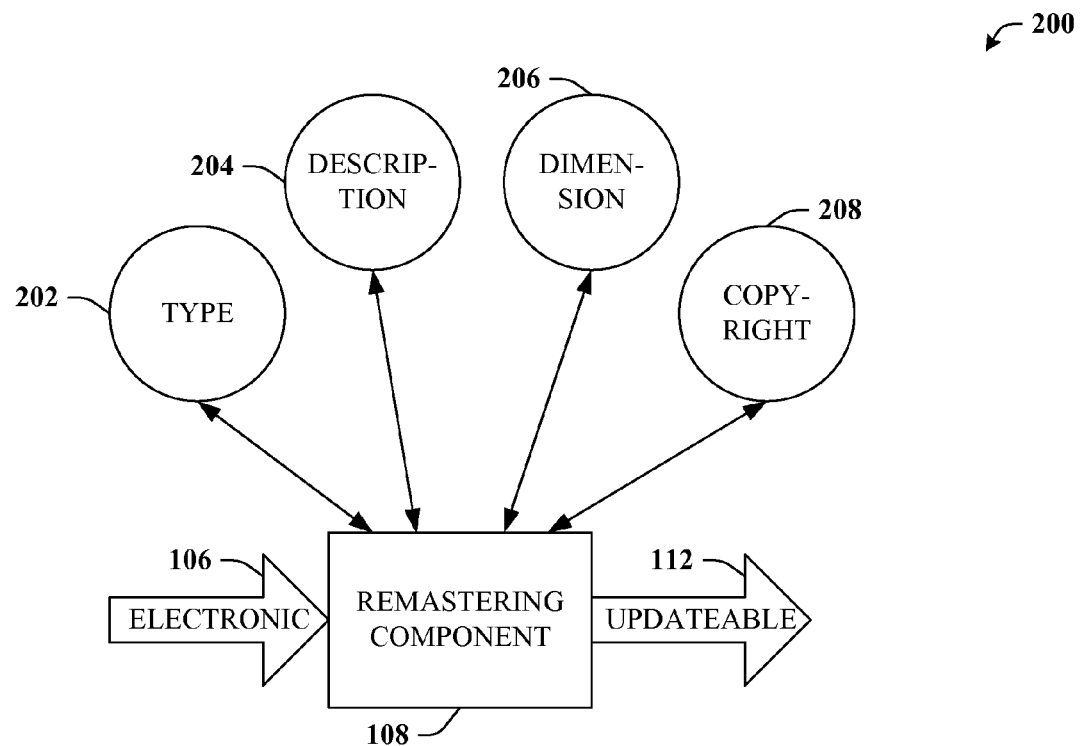
FIG. 2 is a block diagram of a system that can generate updateable media.

While still referencing FIG. 1, but turning also to FIG. 2, system 200 that can generate updateable media is provided. Briefly, system 200 can include remastering component 108 that can identify and tag suitable entities 110 to produce updateable media 112, which can be updated based upon information included in the tags, of which a number of examples are provided by reference numerals 202-208. In accordance therewith, a tag can relate to entity type 202, entity description 204, entity dimension 206, entity copyright 208, and so on. For example, the tag can define the type of suitable entity 110 such as the nature or category of suitable entity 110 (e.g., whether suitable entity 110 is an advertisement, a product, a person, a feature, etc.). In addition, the tag can include descriptions 102 that can, e.g., define sub-classes of type 202 such as product-placement versus banner ad or the like; a particular advertiser or product, etc.

The tag embedded in updateable media 112 can also relate to dimensions 206 of suitable entity 110, wherein dimensions 206 typically refer to a size, a shape and/or a scale of suitable entity 110 as they exist in the original print-based media 104. Additionally, remastering component 108 can also tag suitable entity 110 with copyright information that can relate to legal ownership or use permissions associated with suitable entity 110, updateable media 112, or print-based media 104.

Returning to the discussion of FIG. 1, system 100 can further include compilation component 114 that can catalog updateable media 112 according to a hierarchy or classifications associated with print-based media 104. For example, if print-based media 104 is serial work product, such as newspapers or magazines, then updateable media 112 can be associated with the same or similar series and/or cataloged according to a similar scheme. In addition, compilation component 114 can store updateable media 112 to archive 116 that is associated with print-based media 104. One or more archives 116 can exist in data store 118 that is intended to represent an aggregate store of all data described herein or otherwise useful for later access or recall. Data store 118 is not necessarily intended to be a single physical or logical storage unit and need not be centralized to any specific degree. Rather, data store 118 can be distributed such that all or portions of data therein can reside at distinct locations and all or portions of data therein can be stored by way of distinct schema. Moreover, access to all or portions of data within data store 118 can be regulated by way of credentials, permissions, or another type of security protocol, and certain data may only be available to particular participants or only based upon certain conditions.

Figure 3:
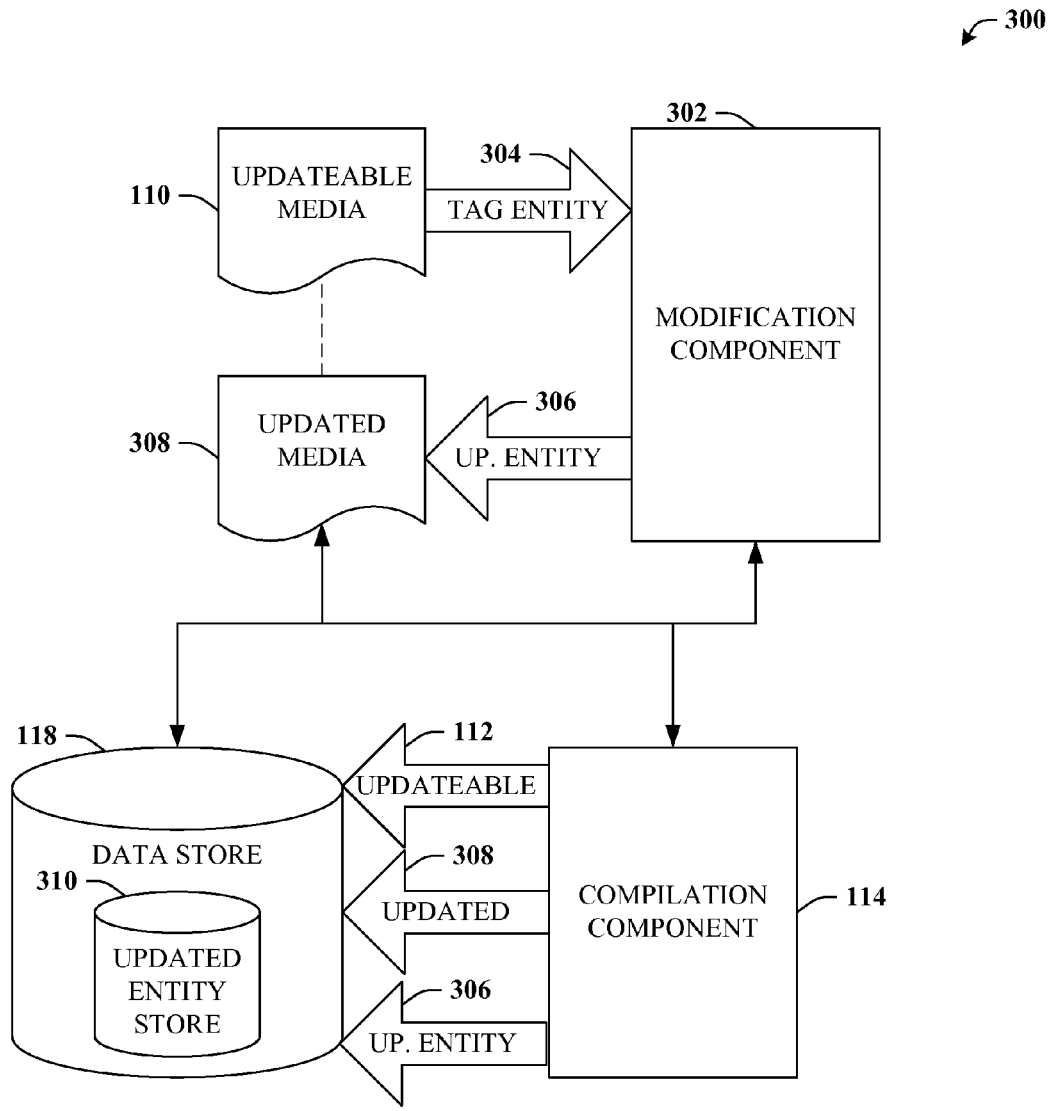
FIG. 3 depicts a block diagram of a system that can modify updateable media and/or produce updated media.

With reference now to FIG. 3, system 300 that can modify updateable media and/or produce updated media is illustrated. Typically, system 300 can include all or portions of components or features described in connection with system 100 of FIG. 1 or elsewhere herein. In addition, system 300 can include modification component 302 that can replace tagged entity 304 (e.g., suitable entity 110 tagged by remastering component 108) with updated entity 306 in order to produce updated media 308. Accordingly, updated media 308 can be substantially similar to updateable media 112 with an exception that one or more tagged entities 304 or suitable entities 110 (e.g., items, elements, or features apparent in print-based media 104 and therefore replicated in electronic media 106) can be replaced by one or more updated entities 306.

FIG. 3 also depicts compilation component 114 that can catalog and store updateable media 112 to archive 116 included in data store 118, as detailed supra. In addition, compilation component 114 can further store updated media 308 to archive 116 or to a different archive (not shown). Regardless, it is to be appreciated that data store 118 can include an archive of remastered print-based media 104 or electronic media 106 in the form of either or both updateable media 112 or updated media 308. Moreover, compilation component 114 can also save updated entity 306 to data store 118. For example, one or more updated entities 306 can be saved to updated entity store 310, which can be accessed by modification component 302 when updating updateable media 112 (e.g., by replacing tagged entity 304 with updated entity 306).

By way of illustration, consider "Times" magazine (e.g. print-based media 104), a well-known publication of news and events founded in 1895 and distributed monthly since that time. Compilation component 114 can create, in data store 118, archive 116 that specifically relates to this periodical in its entirety or, e.g., a particular year, etc. Conversion component 102 can image the magazine to produce associated electronic media 106, wherein a remastered version (e.g., updateable media 112 or updated media 308) can be stored to archive 116 and/or data store 118.

In particular, consider the July, 1940 edition of Times that includes (then) recent stories, illustrations, and graphs pertaining to, say, the economy or business cycles as well as advertisements from well-known businesses. As one example, a chart or graph associated with one of the news pieces that relates to unemployment can be identified and tagged as suitable entity 110. The tag can include metadata that describes entity type 202 (e.g., a chart or graph), description 204 that defines the data (e.g., rate of unemployment from 1910-1940), dimensions (e.g., 2"×2.5"), information relating to copyright 208 (e.g. owner: Times, source: Bureau of Labor Statistics), as well as other kinds of data. Given the information included in tagged entity 304 (e.g. the chart or graph), modification component 302 can replace this with updated entity 306, such as a with a chart that includes similar data up to the year 2000, or with a new set of data, such as inflation rates from 1940-2000. Appreciably, with the addition of such data, ideas, opinions, or prediction with respect to an article can be supported or rejected based upon perspectives that were otherwise not available at the time of writing, potentially leading to valuable reassessments of historical documents, policies, and the like.

As another example, consider suitable entity 110 that is represented in the magazine as a full page advertisement for a new 1941 model Ford sedan. Both the full page ad as well as the elements of the ad such as the car alone can be suitable entity 110. Accordingly, modification component 302 can replace tagged entity 304 with a modernized advertisement provided by an advertiser associated with suitable entity 110. Thus, the 1940 ad can be replaced by a year 2000 ad from Ford that is included in the Times magazine archive 116. Additionally or alternatively, updated entity 306 can be a modernized advertisement that includes a product from suitable entity 110. Hence, only the car itself can be replaced, with the remainder of the ad remaining largely unchanged. The car can be replaced by new model Ford coup or a different manufacturer altogether, say, a truck manufactured by General Motors.

In another aspect of the claimed subject matter, updated entity 110 can be an advertisement tailored to a profile associated with a media consumer. For example, a consumer of updateable media 112 can receive for display updated media 308 that includes updated entities 306 specifically and potentially dynamically tailored to that particular consumer based upon the profile. Accordingly, suppose the advertisement depicting a 1941 Ford sedan might be replaced with an advertisement for a Harley Davidson motorcycle, a Cannondale bicycle, or even a Panasonic Plasma screen television, depending upon what can be collected, determined, or inferred about the media consumer. Moreover, such updated media 308 can be archived and exist as a remastered version of previous media (e.g., 104 or 106) and can, e.g., facilitate additional revenues for the host (e.g., Times magazine), which is further detailed in connection with FIG. 5. It should be appreciated that updated entity 306 need not originate from an advertiser, but can also come from third party data stores or even from the content consumer, which is further described infra.

Figure 4:
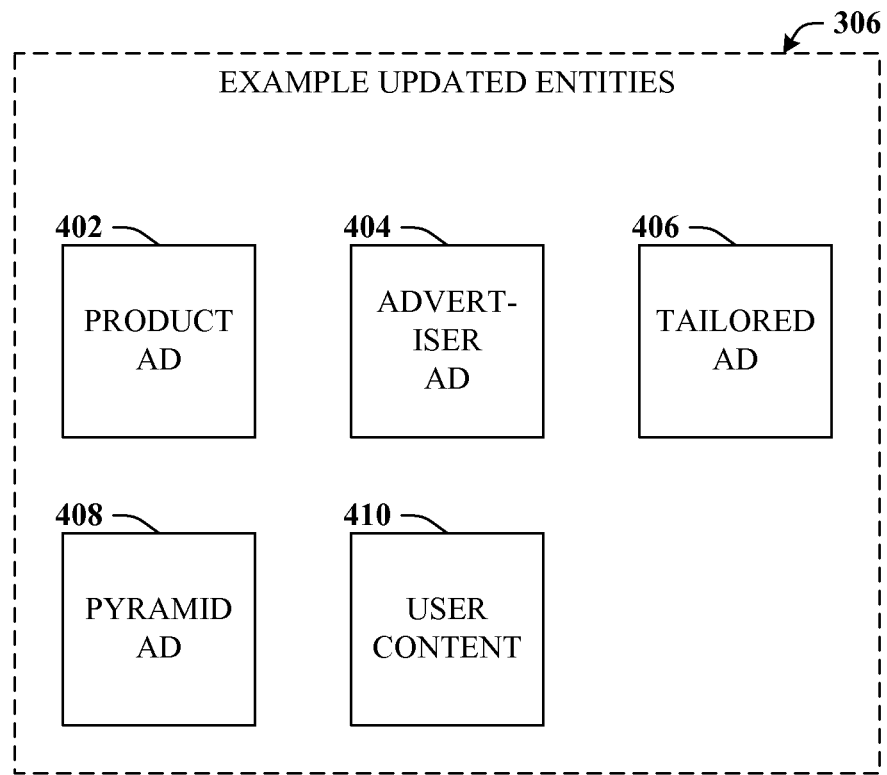
FIG. 4 is a block diagram of a variety of example updated entities 306.

Referring now to FIG. 4, a variety of example updated entities 306 are depicted in order to provide concrete examples, but not necessarily limit the scope or spirit of the appended claims. In accordance therewith, examples of updated entity 306 can include product ad 402, which can relate to the entire ad space for the ad or to a particular product within the ad; or likewise relate to product placement type ads, wherein the product is included with other media that depicts, e.g., a famous actress drinking a particular brand of cola or wearing apparel from a particular designer. In a similar vein, updated entity 306 can be advertiser ad 404, with a distinction that while the advertised product may change, be updated, or modernized, the product or advertisement that constitutes advertiser ad 404 originates from the same advertiser, owner, manufacturer, or producer as the original ad in media 104, 106.

Figure 5:
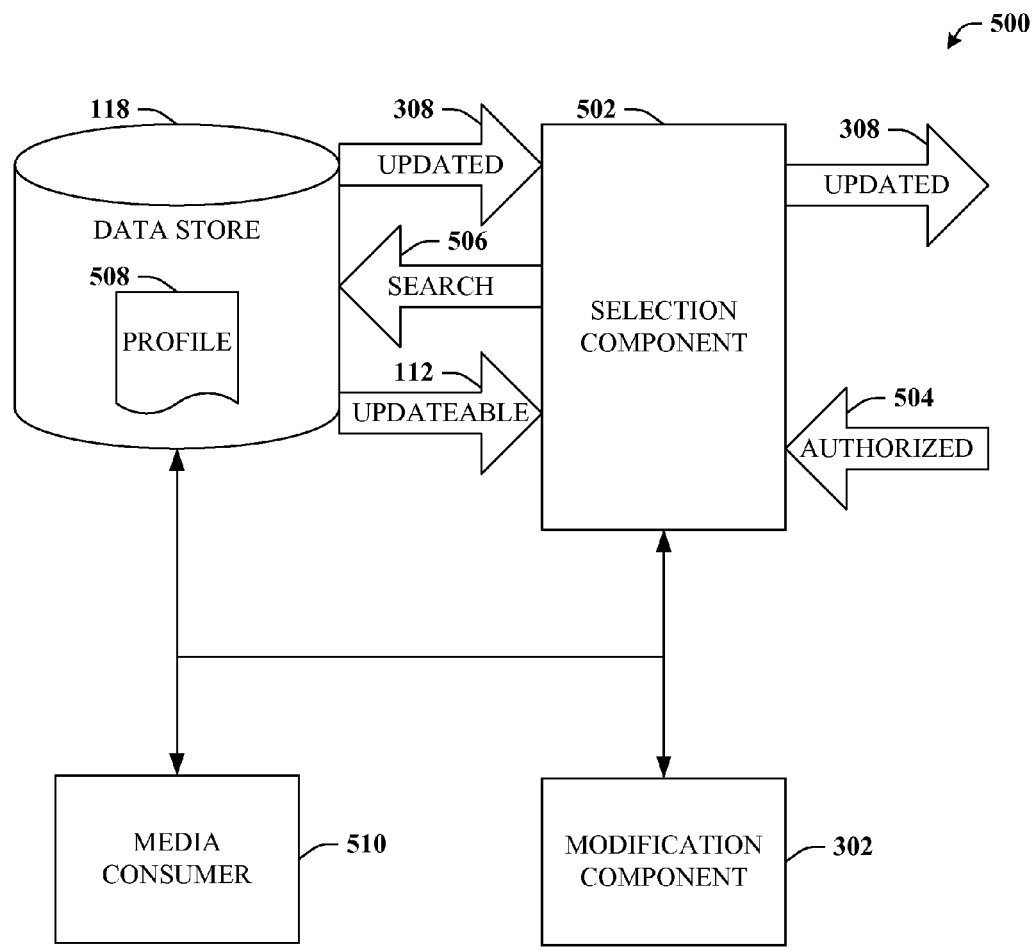
FIG. 5 depicts a block diagram of a system that can select appropriate entities or media for display to a media consumer.

Another example of updated entity 306 can be tailored ad 406 where tailored ad 406 is selected, potentially dynamically, based upon a profile of a media consumer, which is detailed further in connection with FIG. 5. It should be appreciated that updated entity 306 can also be an advertisement that utilizes pyramidal volumes of space, as incorporated by reference and described herein, which is denoted by reference numeral 408 and can be viewable with a display engine, such as display engine 702 described in connection with FIG. 7, infra. In addition, updated entity 306 can be user content 410. More particularly, user content 410 can relate to media provided by a media consumer that can replace suitable entities 110. Accordingly, potentially by employing content aggregator 706, very dynamic content 410 can be provided.

Turning now to FIG. 5, system 500 that selects appropriate entities or media for display to a media consumer is provided. In general, system 500 can include all or portions of components or features detailed in connection with FIG. 1 or 3 and can further include selection component 502 that can retrieve and display updated media 308. For example, selection component 502 can retrieve updated media 308 from data store 118 and display updated media 308 to media consumer 510. According to an aspect, selection component 502 can display updated media 308 with an updated entity 306 obscured unless or until such display is authorized 504. It should be appreciated that in some cases selection component 502 can display updated media 308 electronically such as when displaying to a hardware monitor, while in other cases selection component 502 can physically re-print the updated media from a remastered version (e.g., media 112, 308), to emulate the original print-based media 104, yet with updated entities 306.

Authorization 504 can be, e.g., related to copyrights 208 and/or can be related to a fee or payment required before updated entity 306 is visible without being obscured. For example, drawing on the scenario above, Ford could pay a small ad fee to Times to update the ad for the 1941 model sedan with a 2000 Mustang, and once the fee is received, the updated entity 306 included in updated media 308 can be flagged appropriately and/or a display of updated entity 306 can be displayed with no obscuring. As another example, other ads or updated entities 306 can be picked by selection component 502 based upon profile 508.

Profile 508 can include a variety of information relating to an individual (e.g. media consumer 510), such as that which is expressly described herein as well as other information suitable for or within the spirit of the claimed subject matter. For example, profile 508 can include one or more transaction histories that can relate to substantially any type of consumer transaction such as purchases (e.g., products, services, warranties . . . ), time of purchase, returns, use of coupons, feedback, voting, reviews, or opinions, and so forth.

Additionally, profile 508 can include shopping preferences such as a default shopping mode that, e.g., indicates a style or habits relating to shopping for the individual. For example, the shopping preferences can relate to how likely the individual is to spend extra time shopping to ferret out bargains and/or responsiveness to promotions. Furthermore, the shopping preferences can relate to how likely the individual is shop online or click ads, or to particular policies or practices of certain vendors, etc. Naturally, other examples exist, but it should be appreciated that shopping preferences can relate to many aspects of the individual and can be utilized in several ways. Moreover, shopping preferences can be input directly by the individual, received by way of associated devices, or in some cases inferred based upon, e.g., examination of one or more transaction histories.

Demographic data can also be included in profile 508 such as age, gender, income, as well as hobbies, interests, friends, contacts, or viewpoints. As with shopping preferences, some demographic data can be received as input directly from the individual or other suitable sources, or inferred from what is known or can be determined about the individual. These or other aspects of profile 508 can be employed by selection component 502 to tailor selected updated media 308.

According to an aspect of the claimed subject matter, selection component 502 can examine updated entity 306 (e.g., existing in updated entity store 310 and/or) submitted by media consumer 510 and subsequently search archive 116 (or data store 118) for appropriate updateable media 112. For example, consider Ashley, an avid reader of "Cosmopolitan" magazine. Recently, Ashley discovered Cosmo's online archive that includes updateable media. Ross, who has been dating Ashley for a few years, wants to propose. Thus, Ross submits a colorful ad with the text, "Ashley, will you marry me?" which can be saved to data stores 118 and/or 310 as updated entity 306. Ross can further indicate that his ad should be placed in Cosmopolitan's archives Accordingly, selection component 502 can search this archive for media (e.g., 112 or 308) with suitable entities 110 with respect to his ad. Thus, when Ashley later browses the most recent edition of Cosmo, she will likely notice Ross's ad, for instance, replacing an ad, element, or feature existing in the original print-based media 104.

Figure 6:
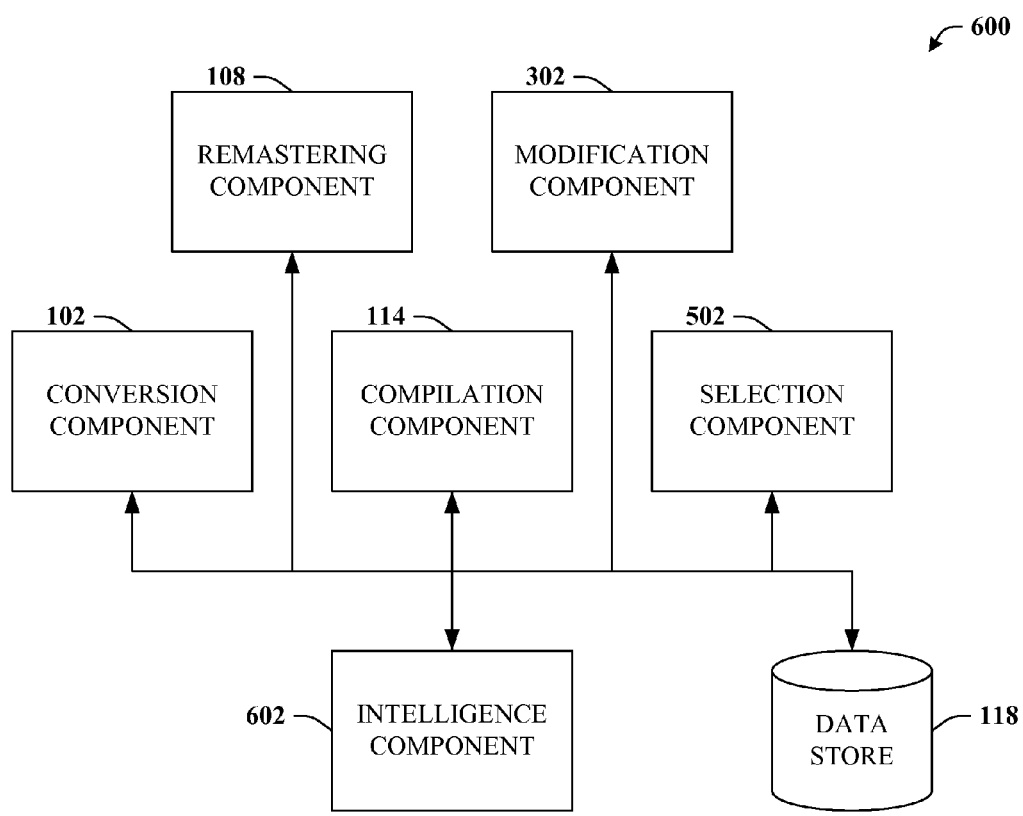
FIG. 6 depicts a block diagram of a system that can aid with various inferences.

With reference now to FIG. 6, system 600 that can aid with various determinations or inferences is depicted. Typically, system 600 can include conversion component 102, remastering component 108, compilation component 114, modification component 302, and selection component 502, which in addition to or in connection with what has been described supra, can also make various inferences or intelligent determinations. For example, conversion component 102 can intelligently convert print-based media 104 to electronic media 106 by utilizing optical character recognition (OCR) techniques for converting text portions of the media 104 into machine-editable text, and including machine learning techniques for populating specialized dictionaries in connection with OCR algorithms, potentially based upon specific publications or advertisers. Likewise, remastering component 108 can intelligently identify suitable entities 110 based upon, e.g., parameters or factors encoded in the tags (e.g., parameters/factors relating to information described at reference numerals 202-208).

Additionally, compilation component 114 can intelligently catalog updateable media 112, updated media 308, or updated entity 306 by, e.g., determining suitable links or references and/or by identifying or establishing a suitable archive 116. Modification component 302 can intelligently replace tagged entity 304 with updated entity 306, by, for example, ensuring there is some contextual basis for such as well as based upon dimensions or level of zoom. Furthermore, selection component 502 can also intelligently search archive 116 for appropriate updateable media and/or search data store 118 for appropriate updated entities 306.

In addition, system 600 can also include intelligence component 602 that can provide for or aid in various inferences or determinations. It is to be appreciated that intelligence component 602 can be operatively coupled to all or some of the aforementioned components. Additionally or alternatively, all or portions of intelligence component 602 can be included in one or more of the components 102, 108, 114, 302, 502. Moreover, intelligence component 602 will typically have access to all or portions of data sets described herein, such as data store 118, and can furthermore utilize previously determined or inferred data.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
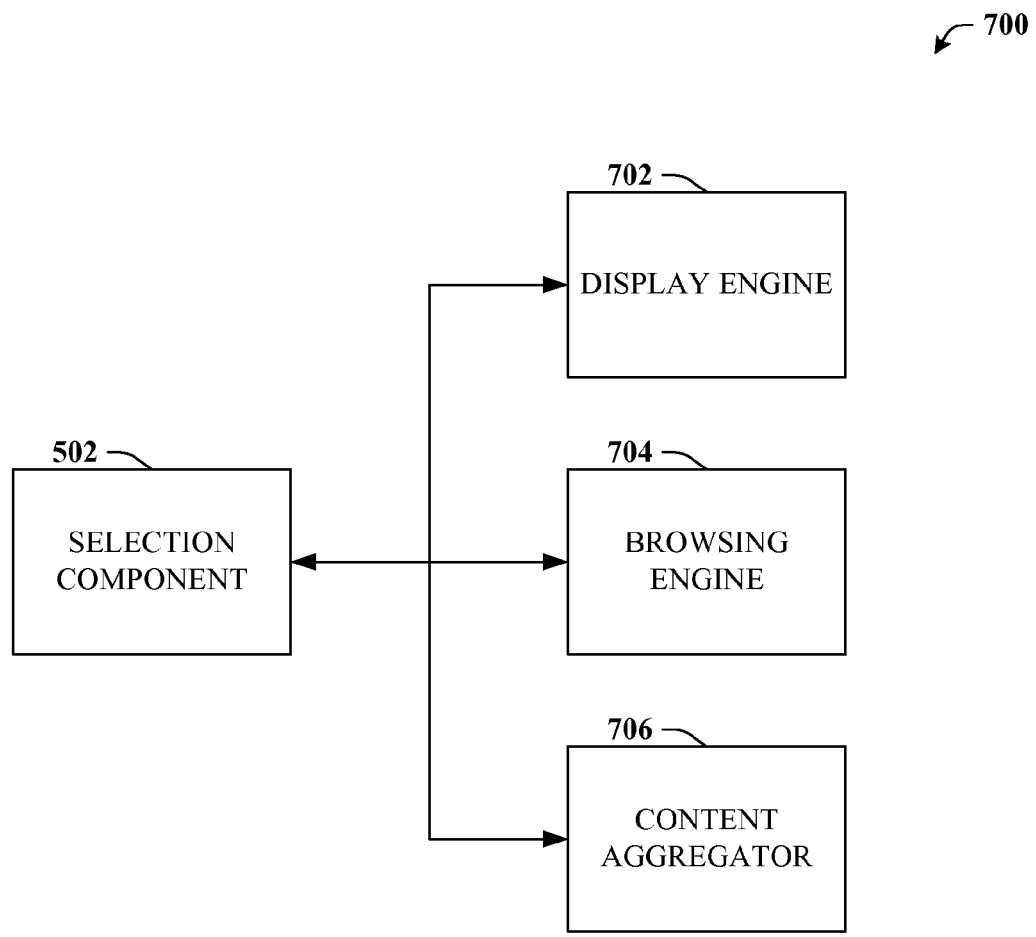
FIG. 7 illustrated a block diagram of a system that can enhance or facilitate display of updated or updateable media by way of additional components.

Turning now to FIG. 7, example system 700 that can enhance or facilitate display of updated or updateable media with additional components is illustrated. Typically, system 700 specially applies to pyramidal volumes of advertising space (e.g., ad 408) and can include display engine 702 that can enable seamless and/or realistic pan or zoom interaction with any suitable display of media 112, 308 or updated entity 306, wherein such media or entity can include multiple scales or planes of views and one or more resolutions or levels of detail associated therewith. In other words, display engine 702 can manipulate an initial default view for displayed data by enabling zooming (e.g. zoom in, zoom out, etc.) and/or panning (e.g., pan up, pan down, pan right, pan left, etc.) in which such zoomed or panned content can include various detail or resolution qualities. Display engine 702 can enable visual information to be smoothly browsed regardless of the amount of data involved or bandwidth of a network. Moreover, display engine 702 can be employed with any suitable display or screen (e.g., portable device, cellular device, monitor, plasma television, etc.). Display engine 702 can further provide at least one of the following benefits or enhancements: 1) speed of navigation can be independent of size or number of objects included in data; 2) performance can depend on a ratio of bandwidth to pixels on a screen or display or an area allocated to media; 3) transitions between views can be smooth; or 4) scaling is near perfect and rapid for screens or media of any resolution.

For example, media can be viewed at a default level with a specific resolution and level of detail. Yet, display engine 702 can allow media to be zoomed and/or panned at multiple scales, planes of view, or levels of detail (in comparison to the default view) with various resolutions. Thus, a user can zoom in on a portion of media such that a greater number of pixels can be devoted to a particular region of content, for example. By enabling the media to be zoomed and/or panned, and ad can include virtually limitless space or volume that can be viewed or explored at various scales, planes of view, or levels of detail. In other words, content can be viewed at a more granular level while maintaining resolution with smooth transitions independent of pan, zoom, etc. Moreover, a higher plane of view may not expose portions of information or data included in the media, while modifying zoom or pan with display engine 702 can do so.

Browsing engine 704 can also be included with system 700. Browsing engine 704 can leverage display engine 702 to implement seamless and smooth panning and/or zooming for any suitable data browsed in connection with at least one of the Internet, a network, a server, a website, a web page, and the like. It is to be appreciated that browsing engine 704 can be a stand-alone component, incorporated into a browser, utilized in combination with a browser (e.g., legacy browser via patch or firmware update, software, hardware, etc.), and/or any suitable combination thereof. For example, browsing engine 704 can incorporate Internet browsing capabilities such as seamless panning and/or zooming into an existing browser. For example, browsing engine 704 can leverage display engine 702 in order to provide enhanced browsing with seamless zoom and/or pan on a website, wherein various scales or views can be exposed by smooth zooming and/or panning.

System 700 can further include content aggregator 706 that can collect a plurality of two dimensional (2D) content (e.g.

media data, images, video, photographs, metadata, etc.) to create a three dimensional (3D) virtual environment that can be explored (e.g., displaying each image and perspective point). In order to provide a complete 3D environment to a user within the virtual environment, authentic views (e.g., pure views from images) can be combined with synthetic views (e.g. interpolations between content such as a blend projected onto the 3D model). For instance, content aggregator 706 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g. seconds, etc.) in order to view a scene from virtually any angle or perspective. In another example, content aggregator 706 can identify substantially similar content and zoom in to enlarge and focus on a small feature or element. Content aggregator 706 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

Figure 8:
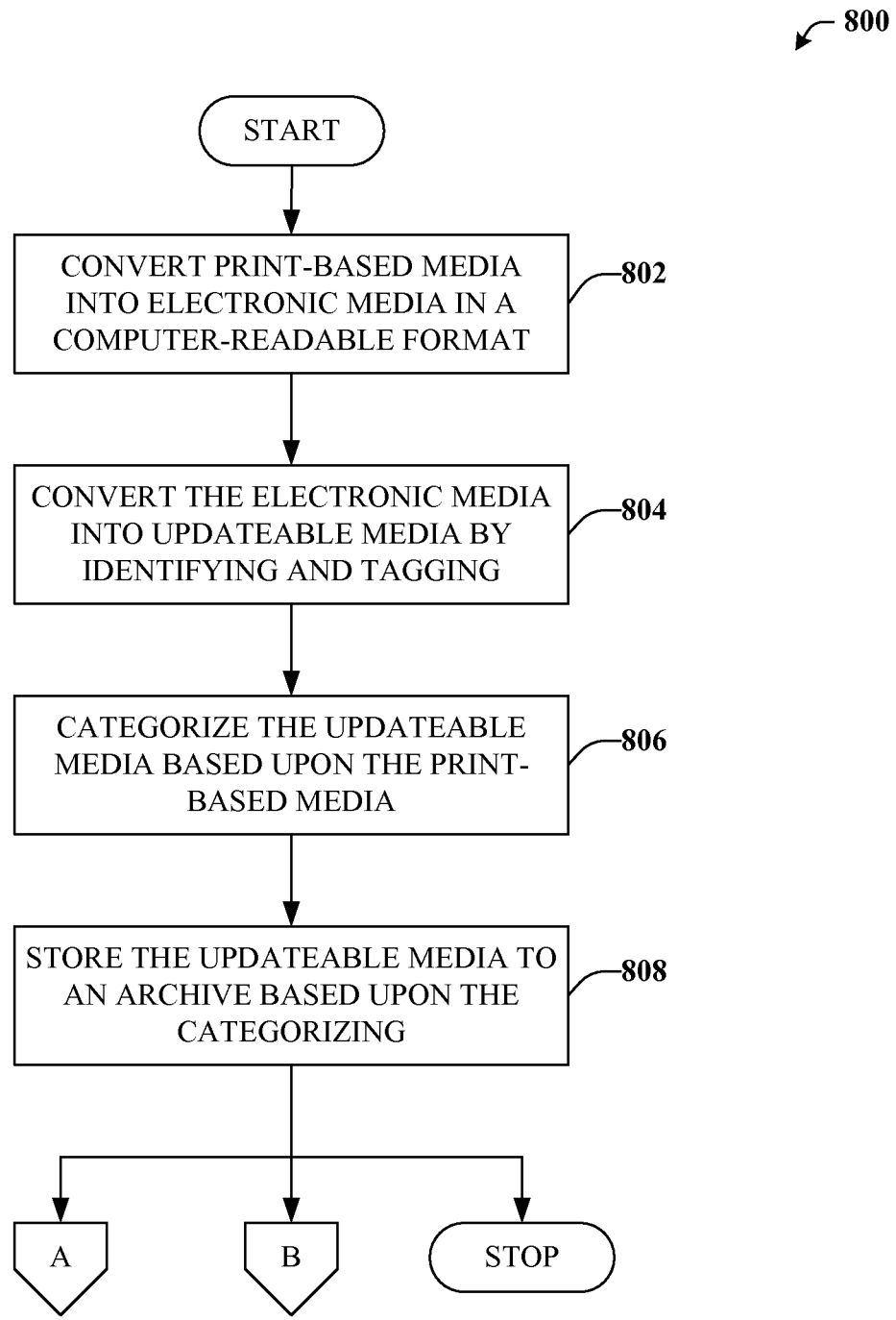
FIG. 8 is an exemplary flow chart of procedures that define a method for providing configurable entities in connection with electronic archives of print-based media.
Figure 9:
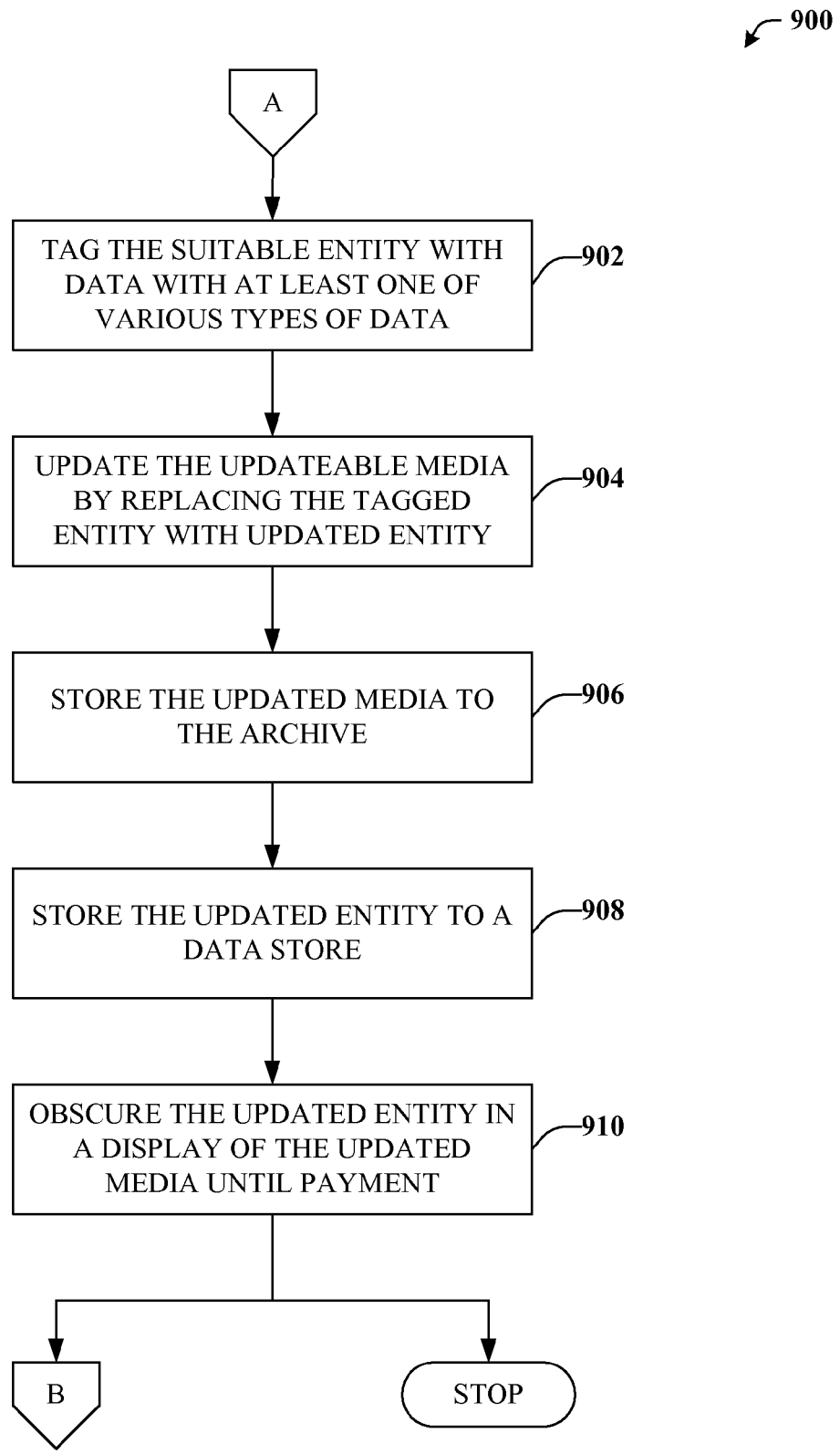
FIG. 9 illustrates an exemplary flow chart of procedures that define a method for providing additional features in connection with providing configurable entities.
Figure 10:
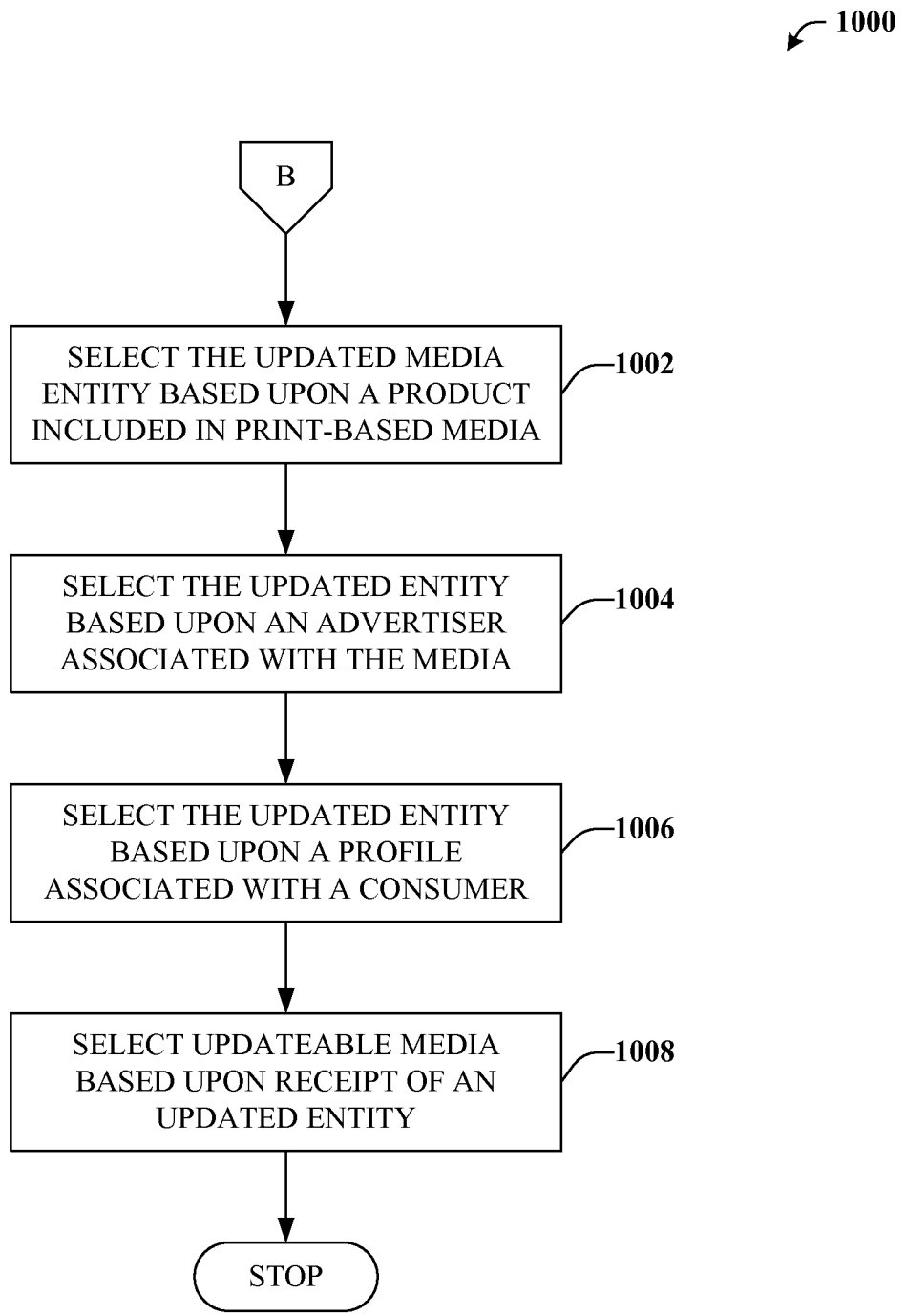
FIG. 10 depicts an exemplary flow chart of procedures defining a method for providing various ways of selecting entities or media in connection with display of archived media.

FIGS. 8, 9, and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 8, exemplary method 800 for providing configurable entities in connection with electronic archives of print-based media is illustrated. Generally, at reference numeral 802, print-based media can be converted into electronic media in a computer-readable format, e.g., by imaging the print-based media. Typically, the print-based media is a serial or periodical, however, such need not necessarily be the case. Appreciably, the conversion can, but need not, include OCR techniques to convert text portion of the print-based media into machine-editable text.

At reference numeral 804, the electronic media noted at act 802 can be further converted into updateable media by identifying and tagging one or more suitable entities. In accordance therewith, the updateable media can become configurable or updateable by virtue of carrying configurable entities, wherein configuration of such can be defined or described by the information included in the tags, which can be, e.g., metadata, annotations, or the like.

At reference numeral 806, the updateable media produced at act 804 can be categorized based upon the print-based media. Those, an overriding theme or schema associated with the print-based media can be incorporated into the act of categorizing. At reference numeral 808, the updateable media can be stored to an archive based upon the act of categorizing detailed at reference numeral 806.

Referring to FIG. 9, exemplary method 900 for providing additional features in connection with providing configurable entities is depicted. For example, at reference numeral 902, the suitable entity identified and tagged in connection with act 804 can be tagged with data associated with at least one of an entity type, an entity description, dimensions of the entity, a copyright associated with the entity, as well as other relevant information. At reference numeral 904, the updateable media can be updated by replacing the entity tagged at act 804 with an updated entity. The updated entity can be generated organically, can be provided by an advertiser, or can be provided by a media consumer.

At reference numeral 906, the updated media can be stored to the archive noted at act 808. In particular, the updated media can replace or be stored in addition to the updateable media. In addition, at reference numeral 908, the updated entity can be stored to a data store, typically a data store including the archives. At reference numeral 910, the updated entity can be obscured in a display of the updated media until a payment is received, typically by the party who submits or provides one or more updated entities included in the updated media.

With reference now to FIG. 10, method 1000 for providing various ways of selecting entities or media in connection with display of archived media is illustrated. Generally, at reference numeral 1002, the updated entity utilized at act 904 can be selected based upon a product included with the associated print-based media. For example, a product appearing in an advertisement or other suitable element or feature of the print-based media can be the basis for selecting the updated entity. Thus, an older model product can be updated with a more modern product of the same domain, line, or category. The updated entity can exist in and be selected from the data store.

At reference numeral 1004, the updated entity can be selected based upon an advertiser associated with the print-based media. For example, the advertiser associated with the suitable element or feature of the print-based media can be the basis for selecting the updated entity. As with act 1002, the updated entity can exist in and be selected from the data store.

At reference numeral 1006, the updated entity can be selected based upon a profile associated with a content consumer. Accordingly, the updated entity can be specifically tailored to the content consumer to facilitate targeted advertising. Appreciably, the various ways of selecting the updated entity detailed herein at acts 1002-1006 can be utilized in conjunction with one another, and based upon access to suitable updated entities included in the data store.

At reference numeral 1008, updateable media can be selected based upon receipt of an updated entity. In particular, apart from choosing an appropriate updated entity to be used with particular updateable or updated media, the converse can apply as well in that suitable updateable or updated media can be selected based upon a given updated entity. Such can be particularly applicable to cases in which a content consumer provides the updated entity for which he or she would like to appear in updateable media.

Figure 11:
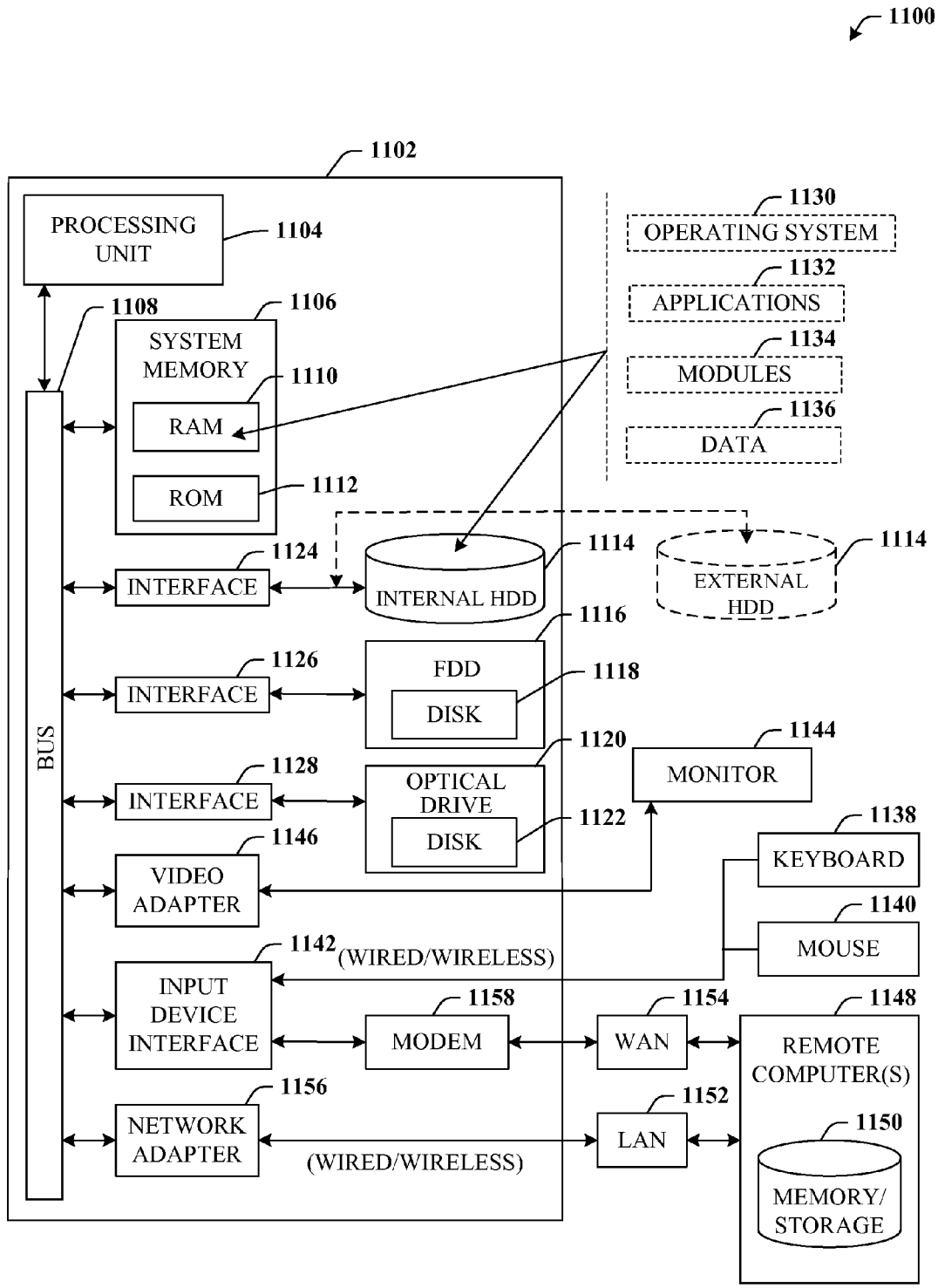
FIG. 11 illustrates a block diagram of a computer operable to execute the disclosed architecture.

Referring now to FIG. 11, there is illustrated a block diagram of an exemplary computer system operable to execute the disclosed architecture. In order to provide additional context for various aspects of the claimed subject matter, FIG. 11 and the following discussion are intended to provide a brief, general description of a suitable computing environment 1100 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the claimed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g. the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 12:
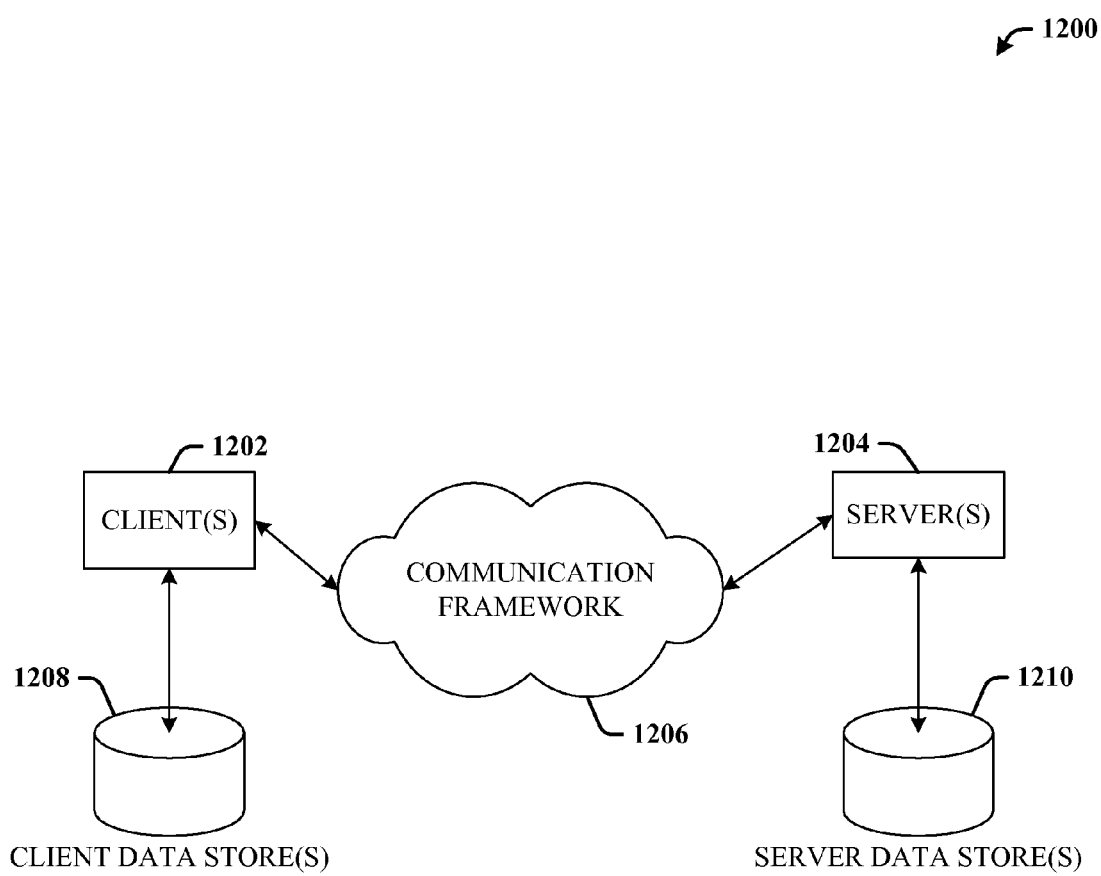
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that provides adaptable entities in connection with electronic archival of print-based media, comprising:
   a conversion component that reproduces print-based media as electronic media in a computer-readable format;
   a remastering component that identifies and tags a suitable entity included in the electronic media and produces updateable media based upon information included in the tags, updating only a tagged entity while the remainder of the updatable media remains unchanged;

a compilation component that catalogs and stores the updatable media to an archive associated with the print-based media; and a selection component that retrieves and that displays the updated media or physically prints the updated media, the selection component displaying the updated media with an updated entity obscured unless or until authorized, the updated entity being authorized for display upon a payment.

2. The system of claim 1, the suitable entity is an electronic representation of an advertisement apparent in the print-based media.

3. The system of claim 1, the suitable entity is an electronic representation of at least one of a product, a person, or a feature apparent in the print-based media.

4. The system of claim 1, the remastering component tags the suitable media with information associated with at least one of an entity type, an entity description, dimensions of the entity, or a copyright associated with the entity.

5. The system of claim 1, further comprising a modification component that replaces a tagged entity with an updated entity to produce updated media.

6. The system of claim 5, the updated entity is a modernized advertisement that includes a product from the suitable entity.

7. The system of claim 5, the updated entity is a modernized advertisement provided by an advertiser associated with the suitable entity.

8. The system of claim 5, the updated entity is an advertisement tailored to a profile associated with a media consumer.

9. The system of claim 5, the updated entity is an advertisement that includes pyramidal volumes of advertising space.

10. The system of claim 5, the updated entity is content submitted by a media consumer.

11. The system of claim 5, the compilation component stores the updated media to the archive.

12. The system of claim 5, the compilation component stores the updated entity to a data store.

13. The system of claim 1, the selection component examines an updated entity submitted by a media consumer and searches the archive for appropriate updateable media.

14. A method for providing configurable entities in connection with electronic archives of print-based media, comprising:

converting print-based media into electronic media in a computer-readable format by imaging the print-based media;

converting the electronic media into updateable media by identifying and tagging a suitable entity;

categorizing the updateable media based upon the print-based media; storing the updateable media to an archive based upon the categorizing;

updating the updatable media by replacing the tagged entity with an updated entity to produce updated media, updating only the tagged entity while the remainder of the updatable media remains unchanged; and retrieving and displaying the updated media or physically printing the updated media, the updated media being displayed with the tagged entity obscured unless or until authorized, the tagged entity being authorized for display upon a payment.

15. The method of claim 14, further comprising at least one of the following acts:

tagging the suitable entity with data associated with at least one of an entity type, an entity description, dimensions of the entity, or a copyright associated with the entity;

storing the updated media to the archive; or storing the updated entity to a data store.

16. The method of claim 14, further comprising at least one of the following acts:

selecting the updated entity based upon a product included with the associated print-based media;

selecting the updated entity based upon an advertiser associated with the print-based media;

selecting the updated entity based upon a profile associated with a content consumer; or selecting updateable media based upon receipt of an updated entity.

17. A system for providing configurable entities in connection with electronic archival of print-based media, comprising:

means for transforming print-based media into electronic media in a computer-readable format;

means for remastering the electronic media as updateable media including identifying and tagging a suitable entity;

means for classifying the updateable media based upon the print-based media;

means for storing the updateable media to an archive based upon the classifying; and means for updating the updateable media, updating only a tagged entity while the remainder of the updatable media remains unchanged, retrieving and displaying the updateable media or physically printing the updateable media, the updateable media being displayed with an updated entity obscured unless or until authorized, the updated entity being authorized for display upon a payment.

* * * * *